(12) United States Patent
Motahari Nezhad et al.

(10) Patent No.: US 10,990,898 B2
(45) Date of Patent: Apr. 27, 2021

(54) AUTOMATIC RULE LEARNING IN SHARED RESOURCE SOLUTION DESIGN

(71) Applicant: International Business Machines Corporation, Armonk, NY (US)

(72) Inventors: Hamid R. Motahari Nezhad, San Jose, CA (US); Taiga Nakamura, Sunnyvale, CA (US); Peifeng Yin, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1011 days.

(21) Appl. No.: 15/598,728

(22) Filed: May 18, 2017

(65) Prior Publication Data
US 2018/0336489 A1 Nov. 22, 2018

(51) Int. Cl.
*G06N 20/00* (2019.01)
*G06N 5/02* (2006.01)
*G06Q 10/00* (2012.01)
*G06F 9/50* (2006.01)

(52) U.S. Cl.
CPC ............. *G06N 20/00* (2019.01); *G06N 5/025* (2013.01); *G06F 9/5077* (2013.01); *G06Q 10/00* (2013.01)

(58) Field of Classification Search
CPC ...................................................... G06N 20/00
USPC ......................................................... 706/12
See application file for complete search history.

(56) References Cited

U.S. PATENT DOCUMENTS

| | | | |
|---|---|---|---|
| 6,571,282 B1 | 5/2003 | Bowman-Amuah et al. | |
| 6,578,068 B1 | 6/2003 | Bowman-Amuah et al. | |
| 7,664,713 B1* | 2/2010 | Haffner | G06N 20/00 706/12 |
| 8,423,483 B2* | 4/2013 | Sadeh-Koniecpol | H04L 63/20 706/12 |
| 8,612,976 B2 | 12/2013 | Arnold et al. | |
| 8,682,820 B2* | 3/2014 | Robinson | G06N 3/0454 706/20 |
| 9,235,442 B2 | 1/2016 | Kampas et al. | |
| 9,244,655 B1 | 1/2016 | Hadar et al. | |
| 9,467,355 B2 | 10/2016 | Doering et al. | |
| 9,542,532 B1* | 1/2017 | McNair | G06Q 50/24 |
| 9,582,406 B1 | 2/2017 | Teplitsky et al. | |
| 2004/0024773 A1* | 2/2004 | Stoffel | G06K 9/6282 |
| 2009/0259503 A1 | 10/2009 | Allen et al. | |
| 2011/0088011 A1 | 4/2011 | Ouali et al. | |

(Continued)

OTHER PUBLICATIONS

Pawliczek, Part to Part and Part to Whole Ratios, Aug. 1, 2012, Manhattan Prep, accessed online at <www.manhattanprep.com/gmat/blog/part-to-part-and-part-to-whole-ratios/> (Year: 2012).*

(Continued)

*Primary Examiner* — James D. Rutten
(74) *Attorney, Agent, or Firm* — Sherman IP LLP; Kenneth L. Sherman; Steven Laut (57) ABSTRACT

One embodiment provides automatically learning shared resource environment solution design rules from a collection of requirement-solution pairs including obtaining requirement-solution pairs. A processor iteratively generates a candidate design rule set from each requirement-solution pair. Candidate design rules from the candidate rule set are filtered to obtain a learned design rule set. The learned design rule set is optimized based on merging design rules.

18 Claims, 9 Drawing Sheets

(56) References Cited

U.S. PATENT DOCUMENTS

| | | | |
|---|---|---|---|
| 2011/0166952 A1* | 7/2011 | Manchikanti | G06Q 30/0611 |
| | | | 705/26.4 |
| 2012/0185821 A1 | 7/2012 | Yaseen et al. | |
| 2012/0304179 A1* | 11/2012 | Devarakonda | G06F 9/505 |
| | | | 718/102 |
| 2013/0263120 A1 | 10/2013 | Patil et al. | |
| 2014/0100912 A1* | 4/2014 | Bursey | G06F 16/29 |
| | | | 705/7.27 |
| 2014/0149492 A1 | 5/2014 | Ananthanarayanan et al. | |
| 2014/0149494 A1 | 5/2014 | Markley et al. | |
| 2014/0149591 A1 | 5/2014 | Bhattacharya et al. | |
| 2014/0279201 A1 | 9/2014 | Iyoob et al. | |
| 2014/0280918 A1 | 9/2014 | Grandhe et al. | |
| 2014/0280961 A1 | 9/2014 | Martinez et al. | |
| 2015/0222723 A1 | 8/2015 | Adapalli et al. | |
| 2015/0304230 A1 | 10/2015 | Suparna | |
| 2015/0324713 A1 | 11/2015 | Haas et al. | |
| 2016/0041835 A1 | 2/2016 | Tung et al. | |
| 2016/0080422 A1 | 3/2016 | Belgodere et al. | |
| 2016/0283879 A1 | 9/2016 | Behrendt et al. | |
| 2016/0357611 A1 | 12/2016 | Sapuram et al. | |
| 2017/0262772 A1* | 9/2017 | Takigawa | G06N 5/04 |
| 2017/0323089 A1 | 11/2017 | Duggal et al. | |
| 2018/0255100 A1* | 9/2018 | Degioanni | G06F 21/52 |
| 2018/0302273 A1 | 10/2018 | Dome et al. | |
| 2018/0332138 A1 | 11/2018 | Liu et al. | |

OTHER PUBLICATIONS

Gui, Z., Yang, C., Xia, J., Huang, Q., Liu, K., Li, Z., Yu, M., Sun, M., Zhou, N., & Jin, B. (2014). A service brokering and recommendation mechanism for better selecting cloud services. PloS one, 9(8), e105297. (Year: 2014).*

Xu, Y., Chen, G. & Zheng, J. An integrated solution—KAGFM for mass customization in customer-oriented product design under cloud manufacturing environment. Int J Adv Manuf Technol 84, 85-101 (2016) (Year: 2016).*

Mell, P., et al., "The NIST Definition of Cloud Computing", National Institute of Standards and Technology Special 800-145, Sep. 2011, pp. 1-7, U.S. Department of Commerce, United States Publication.

Chu, W.C-C. et al., An Approach of Quality of Service Assurance for Enterprise Cloud Computing (QoSAECC), Proceedings of the 2014 International Conference on Trustworthy Systems and their Applications, Jun. 9-10, 2014, pp. 7-13, IEEE, United States.

Anonymoously, "Method and System for Executing Litmus Tests for Cloud Solution Design", Oct. 26, 2010, pp. 1-6, IP.com, United States.

Anonymously, "Automated Reaction Triggered by External Events in Cloud Environments", Jul. 10, 2014, pp. 1-5, IP.com, United States.

List of IBM Patents of Applications Treated as Related, Oct. 2, 2017.

* cited by examiner

| Rule | Evidence | Confidence |
|---|---|---|
| 1 | 2/2=1 | 2/3=0.67 |
| 2 | 3/3=1 | 3/3=1 |
| 3 | 1/1=1 | 1/3=0.33 |
| 4 | 2/2=1 | 2/3=0.67 |
| 5 | 1/1=1 | 1/3=0.33 |

AUTOMATIC RULE LEARNING IN SHARED RESOURCE SOLUTION DESIGN

BACKGROUND

Clients in shared resource environments, such as cloud computing environments, often have requirements of hundreds of virtual machines with complicated configurations. Sales of cloud offering relies on experienced cloud architects to manually design solutions according to customer's requirements, carefully tailoring the scheme, and adjusting the configurations to guarantee i) customer's requirements are satisfied and ii) desired properties, such as price, are kept within a target range. Usually one single round of design may take two—four weeks. Due to the case-by-case solution design, when new customers are added, an architect has to create the client's solution from scratch-up.

SUMMARY

Embodiments relate to automatically learning shared resource environment solution design rules from a collection of requirement-solution pairs. One embodiment provides a method for automatically learning shared resource environment solution design rules from a collection of requirement-solution pairs including obtaining requirement-solution pairs. A processor iteratively generates a candidate design rule set from each requirement-solution pair. Candidate design rules from the candidate rule set are filtered to obtain a learned design rule set. The learned design rule set is optimized based on merging design rules.

These and other features, aspects and advantages of the present invention will become understood with reference to the following description, appended claims and accompanying figures.

DETAILED DESCRIPTION

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

One or more embodiments provide for automatically learning shared resource environment (e.g., a cloud computing environment) solution design rules from a collection of requirement-solution pairs. In one embodiment, a method is provided for automatically learning shared resource environment solution design rules from a collection of requirement-solution pairs including obtaining requirement-solution pairs. A processor iteratively generates a candidate design rule set from each requirement-solution pair. Candidate design rules from the candidate rule set are filtered to obtain a learned design rule set. The learned design rule set is optimized based on merging design rules.

One or more embodiments provide for reusing existing solutions for new requirements, sharing of design expertise among architects and transferring of knowledge from experienced architects to less experienced architects. One or more embodiments improve the efficiency of a cloud solution design by providing automatic or semi-automatic solution generation via learned solution design rules, helps summarize the solution design rules from experienced architects, and helps train new architects in designing cloud solutions.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Figure 1:
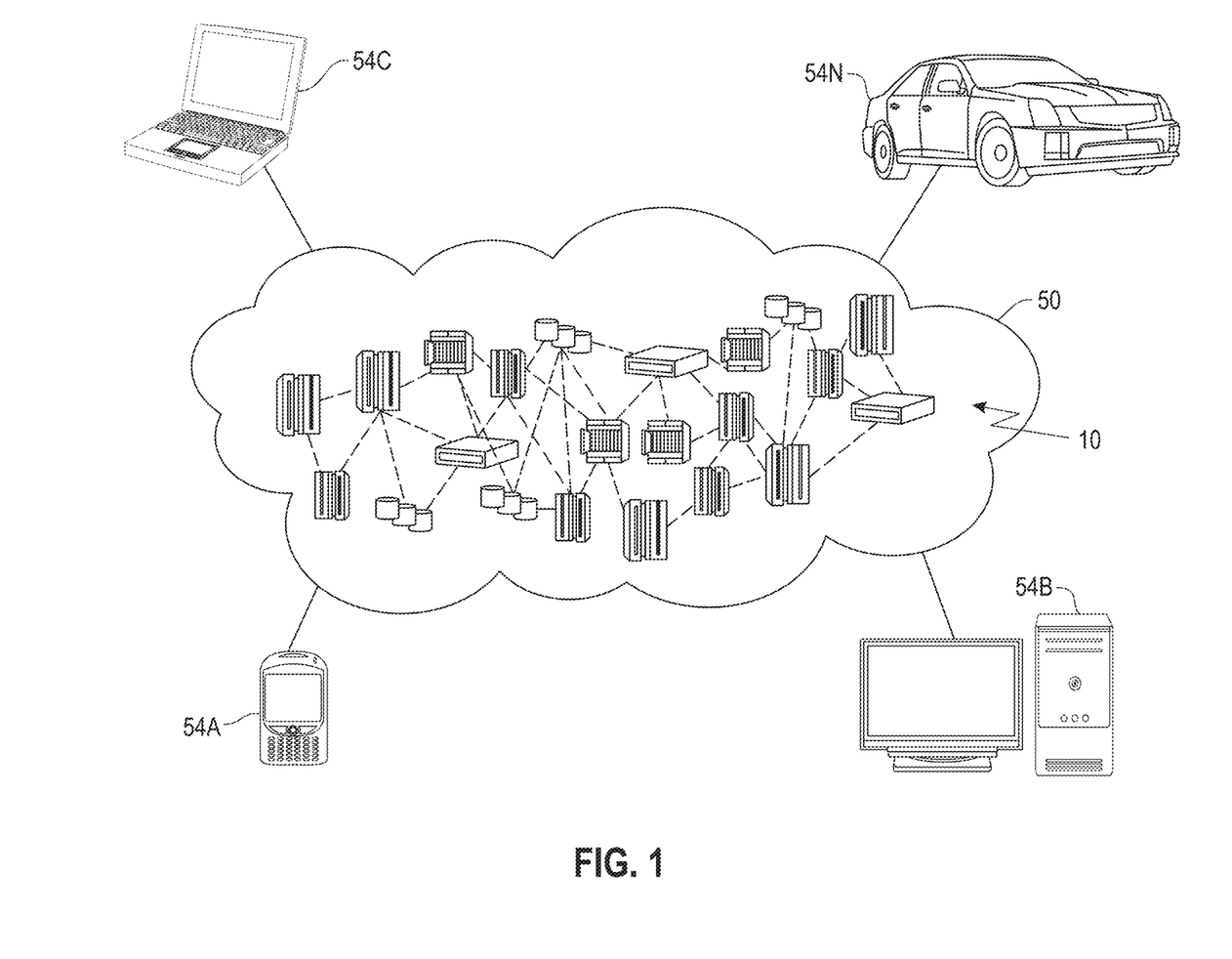
FIG. 1 depicts a cloud computing environment, according to an embodiment.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 2:
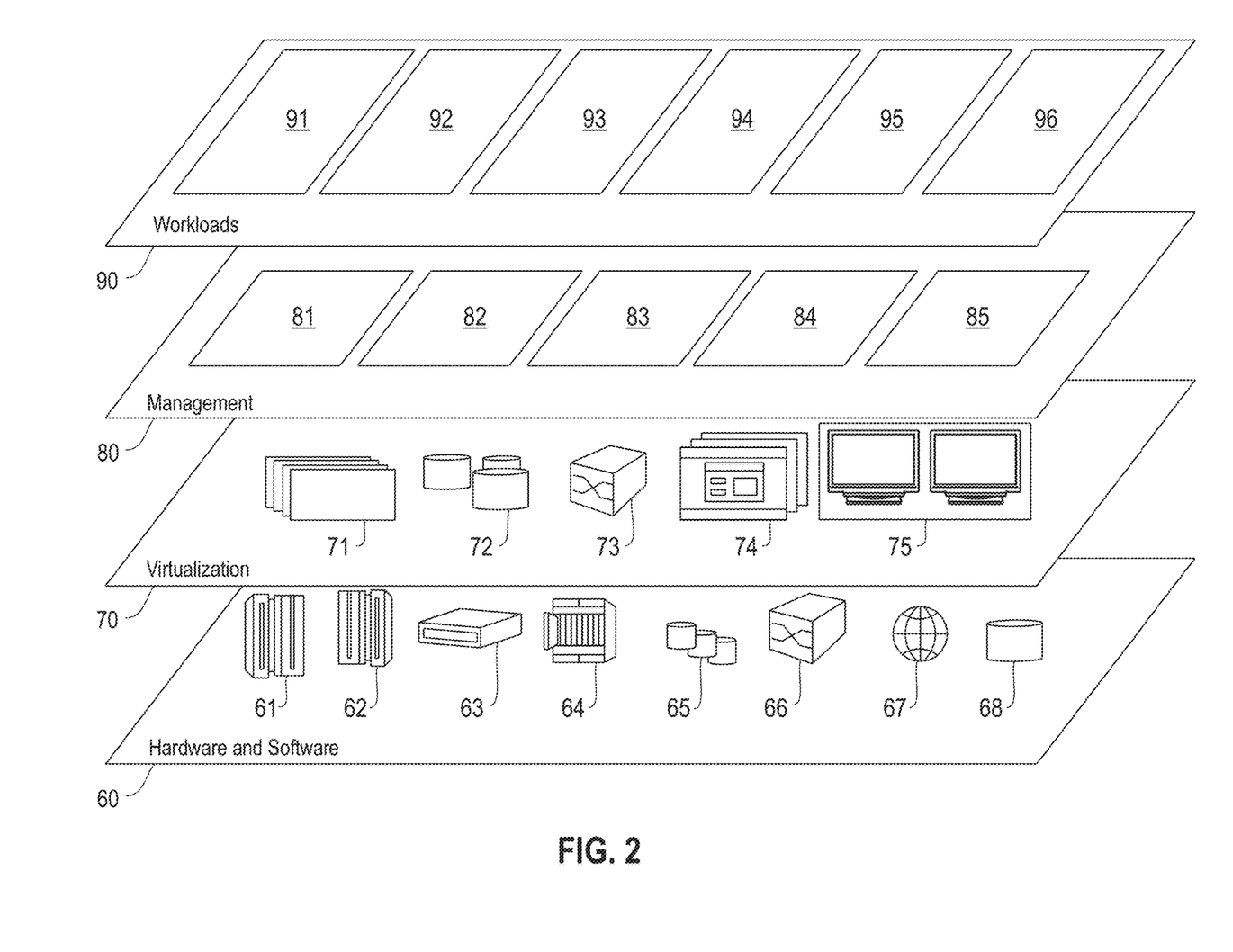
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automatically learning shared resource environment solution design rules from a collection of requirement-solution pairs processing 96. As mentioned above, all of the foregoing examples described with respect to FIG. 2 are illustrative only, and the invention is not limited to these examples.

It is understood all functions of one or more embodiments as described herein may be typically performed by the processing system 300 (FIG. 3) or the autonomous cloud environment 410 (FIG. 4), which can be tangibly embodied as hardware processors and with modules of program code. However, this need not be the case for non-real-time processing. Rather, for non-real-time processing the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Figure 3:
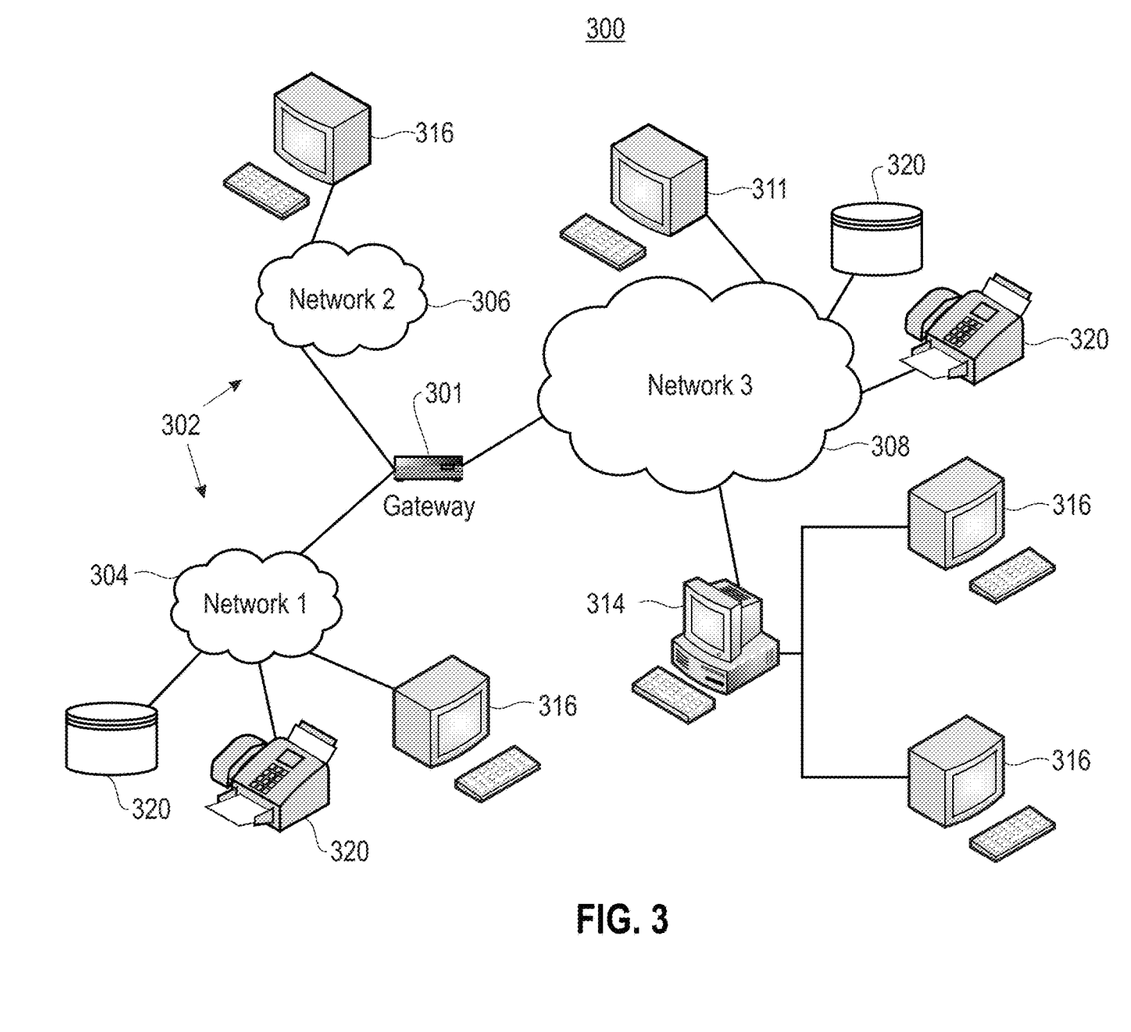
FIG. 3 is a network architecture for efficient representation, access and modification of variable length data objects, according to an embodiment.

FIG. 3 illustrates a network architecture 300, in accordance with one embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 311 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

Figure 4:
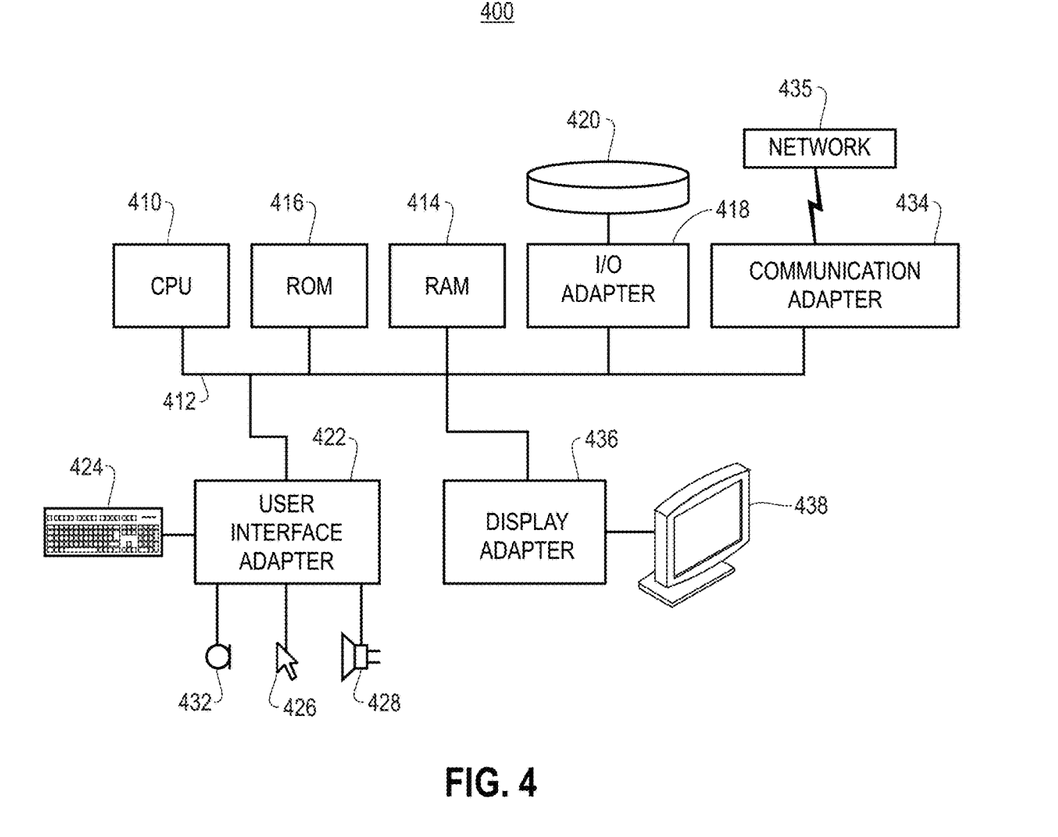
FIG. 4 shows a representative hardware environment that may be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

Figure 5:
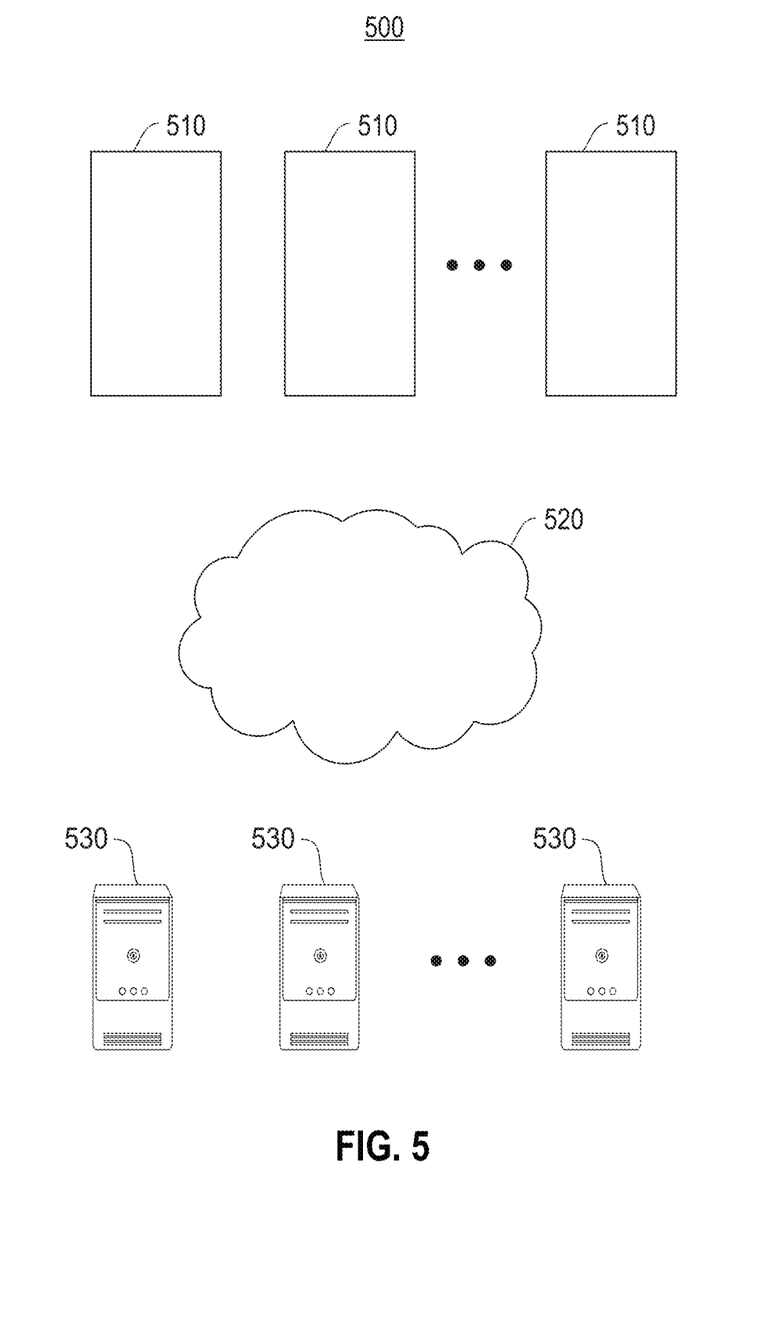
FIG. 5 is a block diagram illustrating system for automatically learning shared resource environment solution design rules from a collection of requirement-solution pairs, according to one embodiment.

FIG. 5 is a block diagram illustrating a system 500 for automatically learning shared resource environment solution design rules from a collection of requirement-solution pairs, according to one embodiment. In one embodiment, the system 500 includes client devices 510 (e.g., mobile devices, smart devices, computing systems, etc.), a cloud or resource sharing environment 520, and servers 530. In one embodiment, the client devices are provided with cloud services from the servers 530 through the cloud or resource sharing environment 520.

Figure 6:
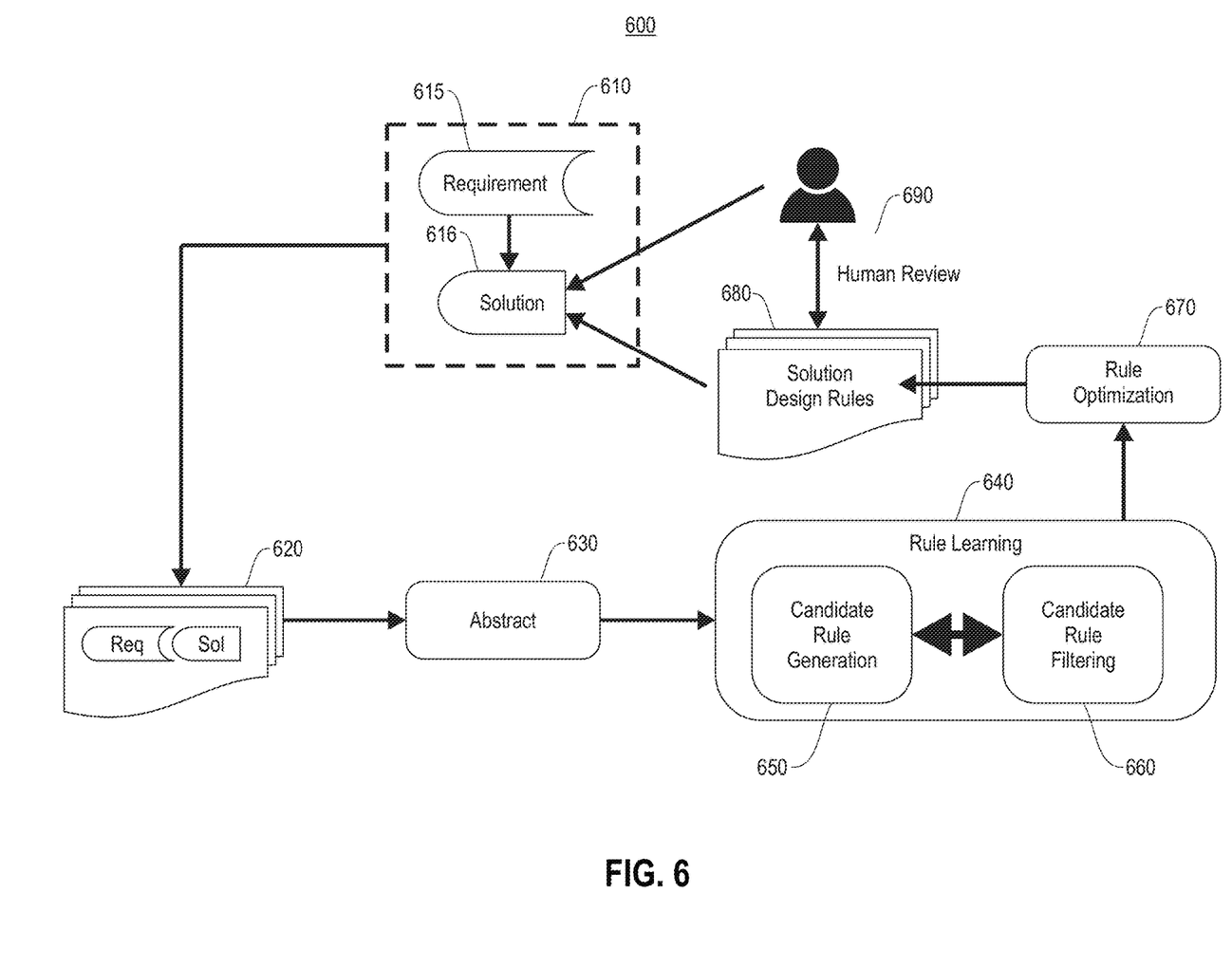
FIG. 6 illustrates block diagram for a system flow for automatically learning shared resource environment solution design rules from a collection of requirement-solution pairs, according to one embodiment.
Figure 7:
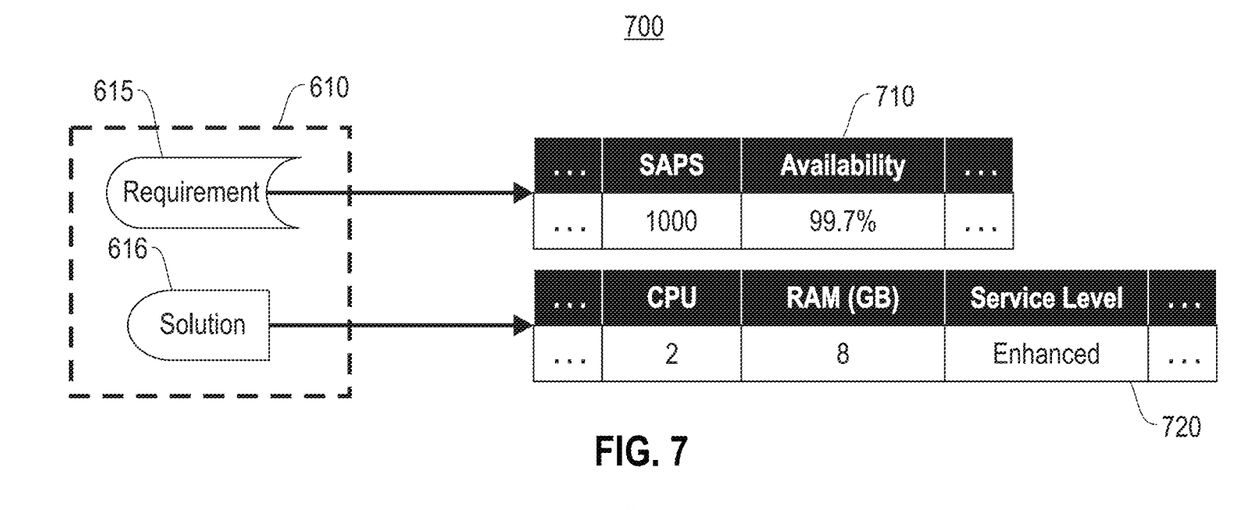
FIG. 7 illustrates an example diagram for requirement and solution objects being both abstract to a series of attribute-value pairs, according to one embodiment.

FIG. 6 illustrates block diagram for a system flow 600 for automatically learning shared resource environment solution design rules from a collection of requirement-solution pairs, according to one embodiment. In one embodiment, the system flow 600 includes obtaining from memory (e.g., a data store, database, etc.) requirement-solution pairs 620 for resource sharing environments (e.g., a cloud computing environment, etc.). The requirement and solution objects are both abstract 630 to a series of attribute-value pairs. Rule learning 640 includes candidate (design) rule generation 650 and candidate (design) rule filtering 660. Rule optimization 670 optimizes the design rule set based on rule merging as described below. The result (solution) design rules 680 are then provided to a client device for user review 690. If the solution 616 is acceptable, the design rule 610 (including the requirement 615 and solution 616) is stored as a requirement-solution pair 620 for future use. FIG. 7 illustrates an example diagram 700 for design rule 610 including a requirement 615 and solution 616 objects being both abstract to a series of attribute-value pairs, according to one embodiment. In the example diagram 700, the requirement 710 includes 1000 system, applications and products (SAPs) and 99.7% availability. The solution 720 includes 2 central processing units (CPUs), 8 gigabytes (GBs) of random-access memory (RAM), and an enhanced service level.

Returning back to FIG. 6, the process for learning design rules in block 640 is now described. In one embodiment, the inputs are requirement and solution pairs 620. The output is a learned design rule(s){$r_{jl}$ . . . $r_{jm}$→s}, where r represents design rules, s represents a solution, and j and m are positive integers. In one embodiment, learning design rules includes:

1. finding/obtaining direct copy-n-paste rule(s), i.e., $r_i$→s & $r_i$=s.
2. For remaining candidate design rules, set k=1.
3. Given k, block 640 generates candidate rules from the last iteration.
4. For each candidate rule ($r_{il}$ . . . $r_{in}$→s), where |$r_i$|=k, block 640 calculates the evidence.
5. All design rules whose evidence is above an evidence threshold are retained; if there is no design rule whose evidence is above the threshold, then proceed to 7.
6. Set k=k+1, construct candidate rules of the next iteration by adding new attributes to rules at iteration k; and proceed to 3.
7. For all remaining candidate design rules in iteration k−1, calculate the confidence score and retain those with highest confidence.

Figure 8:
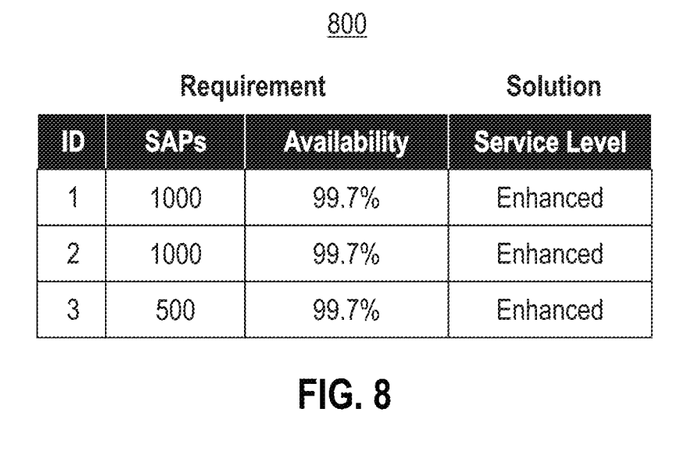
FIG. 8 illustrates an example table of requirements and solutions, according to one embodiment.

FIG. 8 illustrates an example table 800 of requirements and solutions, according to one embodiment. Requirement-Solution pairs (R,S) include:

Requirement attribute-value pair: $r_1, r_2, \ldots, r_m$
Solution attribute-value pair: $s_1, s_2, \ldots, s_n$.

A rule is defined as the mapping from requirement to a solution

In example table 800, the first three of the following requirements and solutions are shown for the following design rules:

Rule 1: SAPs=1000 & Availability=99.7→Service Level=Enhanced
Rule 2: Availability=99.7→Service Level=Enhanced
Rule 3: SAPs=500 & Availability=99.7%→Service Level=Enhanced
Rule 4: SAPs=1000→Service Level=Enhanced
Rule 5: SAPs=500→Service Level=Enhanced.

Figure 9:
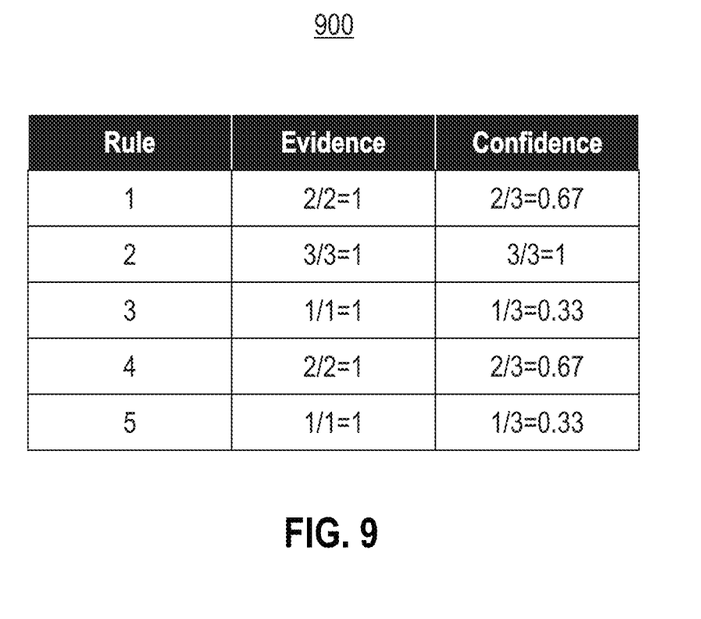
FIG. 9 illustrates an example table of evidence and confidence for rules, according to one embodiment.

FIG. 9 illustrates an example table 900 of evidence and confidence for rules, according to one embodiment. In one embodiment, for learning the design rules, two factors need to be determined, evidence and confidence. Evidence measures how accurate the rule is P($s_{il}, \ldots, s_{in}|r_{jl}, \ldots, r_{jm}$). Confidence measures how common the requirements are observed in existing data P($r_{jl}, \ldots, r_{jm}$). The evidence score of a design rule includes a number of combined requirement and solution attribute-value pairs divided by requirement attribute-value pairs. The confidence score of a design rule comprises a number of requirement attribute-value pairs divided by a total number of requirement-solution pairs. For the above five (rules 1-5) design rules, table 900 shows evidence and confidence.

Returning to FIG. 6, in one embodiment, in block 660 candidate design rule filtering includes calculating evidence scores of each candidate design rule and retaining candidate design rules having higher evidence score than an evidence score threshold, and for remaining candidate design rules with a same solution attribute, calculating a confidence score and retaining a candidate design rule with a highest confidence score.

In one embodiment, in block 650 candidate design rules are generated as follows. In one embodiment, the input includes a learned design rule set of the last iteration. The output includes the candidate design rule set for the next iteration.

1. If the learned rule set of the last iteration is empty (i.e., k=1), proceed to 2; otherwise proceed to 3.
2. For each requirement and solution pair, generate a candidate design rule as $r_i$→$s_j$ where $r_i$ is a single attribute-value pair in requirement and $s_j$ is a solution.
3. For each learned design rule ($r_{il}, \ldots, r_{in}$→$s_j$) and each $r_k$ that is currently not included, generate a new candidate rule ($r_{il}, \ldots, r_{in}, r_k$→$s_j$).

In one embodiment, block 670 includes optimizing the learned design rule set output from block 640. The input includes the learned design rules from block 640. The output includes an optimized design rule set.

1. For each design rule in the set, system flow 600 performs the following:
2. Find other design rules that share the same solution attributes and merge the two requirement attributes, denoted as A and B
   1. If A∩B=ϕ, merge as "A or B"
   2. Otherwise, C=A∩B, merge as "C and [(A−C) or (B−C)]"
3. Find other design rules that share the same requirement attributes, then merge the solution attributes.
4. Repeat 2-3 until there is no change to the design rule set.

Figure 10:
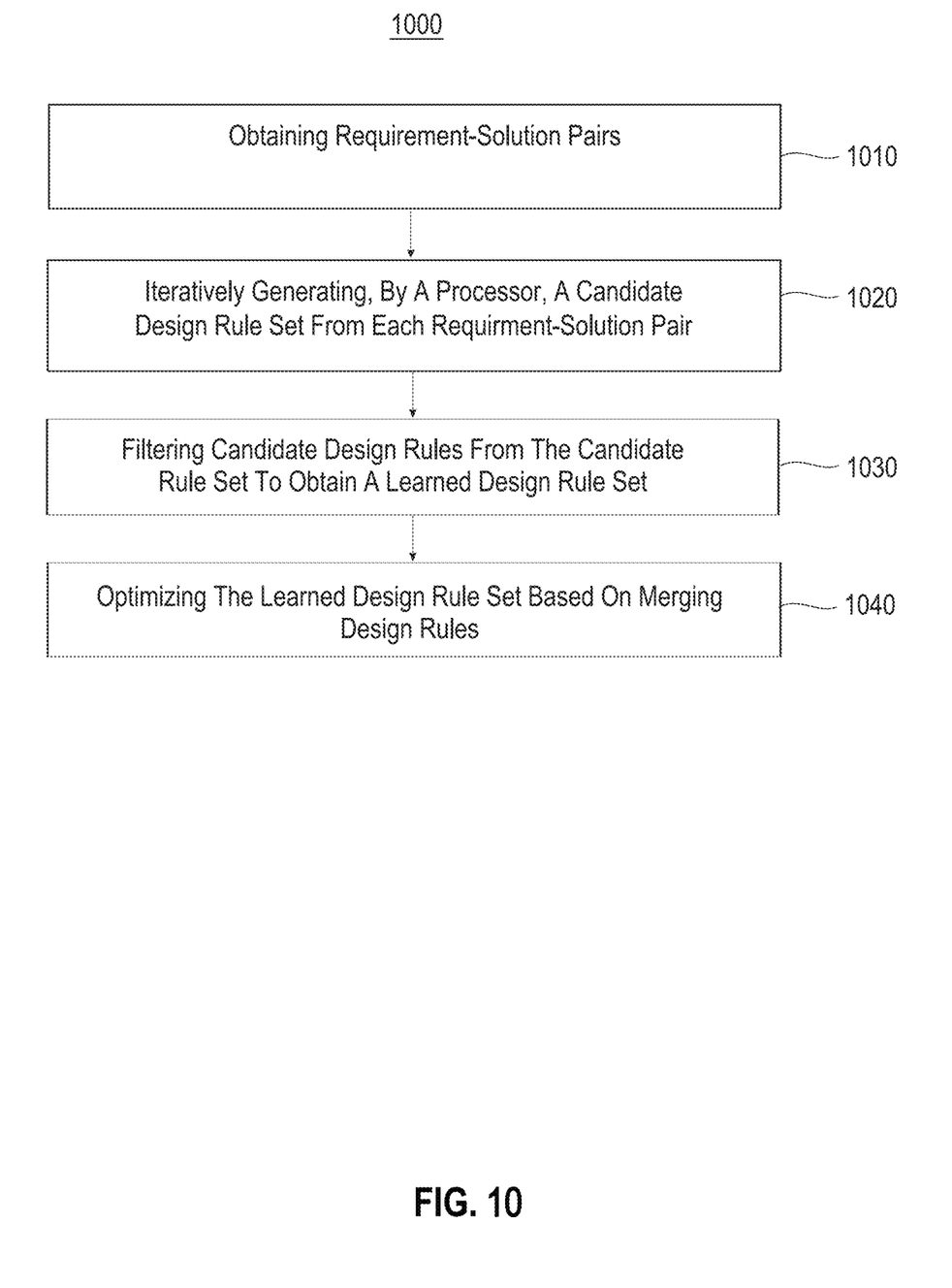
FIG. 10 illustrates a block diagram for a process for automatically learning shared resource environment solution design rules from a collection of requirement-solution pairs, according to one embodiment.

FIG. 10 illustrates a block diagram for a process 1000 for automatically learning shared resource environment solution design rules from a collection of requirement-solution pairs, according to one embodiment. In block 1010, process 1000 obtains requirement-solution pairs. In block 1020, process 1000 iteratively generates (e.g., by a hardware processor) a candidate design rule set from each requirement-solution pair. In block 1030, process 1000 filters candidate design rules from the candidate rule set to obtain a learned design rule set. In block 1040, process 1000 optimizes the learned design rule set based on merging design rules.

In one embodiment, in process 1000 a requirement is abstracted as a series of attribute-value pairs. A solution is abstracted as a series of attribute-value pairs. In process 1000, a design rule includes at least one requirement attribute-value pair and at least one solution attribute-value pair. In one embodiment, process 1000 may include generating the candidate design rule set by: for a first iteration, generating candidate design rules with a single requirement attribute and a single solution attribute, and for other iterations, generating candidate design rules from a previous candidate rule by adding one uncovered requirement attribute.

In one embodiment, in process 1000 filtering candidate design rules includes: calculating evidence scores of each candidate design rule and retain candidate design rules having higher evidence score than an evidence score threshold, and for remaining candidate design rules with a same solution attribute, calculating a confidence score and retaining a candidate design rule with a highest confidence score. In one embodiment, the evidence score of a design rule includes a number of combined requirement and solution attribute-value pairs divided by requirement attribute-value pairs. The confidence score of a design rule includes a number of requirement attribute-value pairs divided by a total number of requirement-solution pairs.

In one embodiment, optimizing learned design rule includes merging design rules with same solution attributes with operators (e.g., logical operators) and/or functions, etc., and merging design rules with same requirement attributes with operators and/or functions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C.

section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for automatically learning shared resource environment solution design rules from a collection of requirement-solution pairs comprising:
    obtaining requirement-solution pairs fora shared resource environment from a data store;
    iteratively generating, by a processor, an output candidate design rule set from each requirement-solution pair, wherein each generating iteration uses an input including the candidate design rule set output from a previous generating iteration;
    iteratively filtering candidate design rules from the output candidate design rule set to obtain a learned design rule set, wherein filtering candidate design rules comprises:
        calculating evidence scores of each candidate design rule and retain candidate design rules having higher evidence score than an evidence score threshold; and
        for remaining candidate design rules with a same solution attribute, calculating a confidence score and retaining a candidate design rule with a highest confidence score; and
    optimizing the learned design rule set based on iteratively merging requirement attributes and iteratively merging solution attributes of design rules.

2. The method of claim 1, wherein a requirement is abstracted as a series of attribute-value pairs.

3. The method of claim 1, wherein a solution is abstracted as a series of attribute-value pairs.

4. The method of claim 1, wherein a design rule comprises at least one requirement attribute-value pair and at least one solution attribute-value pair.

5. The method of claim 1, wherein iteratively generating the candidate design rule set comprises:
    for a first iteration, generating candidate design rules with a single requirement attribute and a single solution attribute; and
    for other iterations, generating candidate design rules from a previous candidate rule by adding one uncovered requirement attribute.

6. The method of claim 1, wherein the evidence score of a design rule comprises a number of combined requirement and solution attribute-value pairs divided by requirement attribute-value pairs.

7. The method of claim 1, wherein the confidence score of a design rule comprises a number of requirement attribute-value pairs divided by a total number of requirement-solution pairs.

8. The method of claim 1, wherein
    iteratively merging the requirement attributes of the design rules comprises iteratively merging the requirement attributes with same solution attributes with at least one of operators and functions; and
    iteratively merging the solution attributes of the design rules comprises iteratively merging the solution attributes with same requirement attributes with at least one of operators and functions.

9. A computer program product for automatically learning shared resource environment solution design rules from a collection of requirement-solution pairs, the computer program product comprising a computer readable storage medium having program instructions embodied therewith, the program instructions executable by a processor to cause the processor to:
    obtain, by the processor, requirement-solution pairs fora shared resource environment from a data store;
    iteratively generate, by the processor, an output candidate design rule set from each requirement-solution pair, wherein each generation iteration uses an input including the candidate design rule set output from a previous gene ration iteration;
    iteratively filter, by the processor, candidate design rules from the output candidate design rule set to obtain a learned design rule set, wherein filtering candidate design rules comprises:
        calculating evidence scores of each candidate design rule and retain candidate design rules having higher evidence score than an evidence score threshold; and
        for remaining candidate design rules with a same solution attribute, calculating a confidence score and retaining a candidate design rule with a highest confidence score; and
    optimize, by the processor, the learned design rule set based on iteratively merging requirement attributes and iteratively merging solution attributes of design rules.

10. The computer program product of claim 9, wherein a requirement is abstracted as a series of attribute-value pairs.

11. The computer program product of claim 9, wherein a solution is abstracted as a series of attribute-value pairs.

12. The computer program product of claim 9, wherein a design rule comprises at least one requirement attribute-value pair and at least one solution attribute-value pair.

13. The computer program product of claim 9, wherein iteratively generating the candidate design rule set comprises:
    for a first iteration, generating candidate design rules with a single requirement attribute and a single solution attribute; and
    for other iterations, generating candidate design rules from a previous candidate rule by adding one uncovered requirement attribute.

14. The computer program product of claim 9, wherein:
the evidence score of a design rule comprises a number of combined requirement and solution attribute-value pairs divided by requirement attribute-value pairs; and
the confidence score of a design rule comprises a number of requirement attribute-value pairs divided by a total number of requirement-solution pairs.

15. The computer program product of claim 9, wherein:
iteratively merging the requirement attributes of the design rules comprises iteratively merging the requirement attributes with same solution attributes with at least one of operators and functions; and
iteratively merging the solution attributes of the design rules comprises iterative merging the solution requirements with same requirement attributes with at least one of operators and functions.

16. An apparatus comprising:
a memory configured to store instructions; and
a server including a processor configured to execute the instructions to:
   obtain, by the processor, requirement-solution pairs for a shared resource environment from a data store;
   iteratively generate, by the processor, an output candidate design rule set from each requirement-solution pair, wherein each generating iteration uses an input including the candidate design rule set output from a previous generating iteration;
   iteratively filter, by the processor, candidate design rules from the output candidate design rule set to obtain a learned design rule set, wherein filtering candidate design rules comprises:
      calculating evidence scores of each candidate design rule and retain candidate design rules having higher evidence score than an evidence score threshold; and
      for remaining candidate design rules with a same solution attribute, calculating a confidence score and retaining a candidate design rule with a highest confidence score; and
   optimize, by the processor, the learned design rule set based on iteratively merging requirement attributes and iteratively merging solution attributes of design rules.

17. The apparatus of claim 16, wherein:
a requirement is abstracted as a series of attribute-value pairs;
a solution is abstracted as a series of attribute-value pairs;
a design rule comprises at least one requirement attribute-value pair and at least one solution attribute-value pair; and
iteratively generating the candidate design rule set comprises:
   for a first iteration, generating candidate design rules with a single requirement attribute and a single solution attribute; and
   for other iterations, generating candidate design rules from a previous candidate rule by adding one uncovered requirement attribute.

18. The apparatus of claim 16, wherein:
the evidence score of a design rule comprises a number of combined requirement and solution attribute-value pairs divided by requirement attribute-value pairs;
the confidence score of a design rule comprises a number of requirement attribute-value pairs divided by a total number of requirement-solution pairs; and
iteratively merging the requirement attributes of the design rules comprises iteratively merging the requirement attributes with same solution attributes with at least one of operators and functions; and
iteratively merging the solution attributes of the design rules comprises iteratively merging the solution attributes with same requirement attributes with at least one of operators and functions.

\* \* \* \* \*